F. M. DU BOIS.
DETACHABLE TROLLEY HARP.
APPLICATION FILED FEB. 6, 1914.
1,145,006.
Patented July 6, 1915.
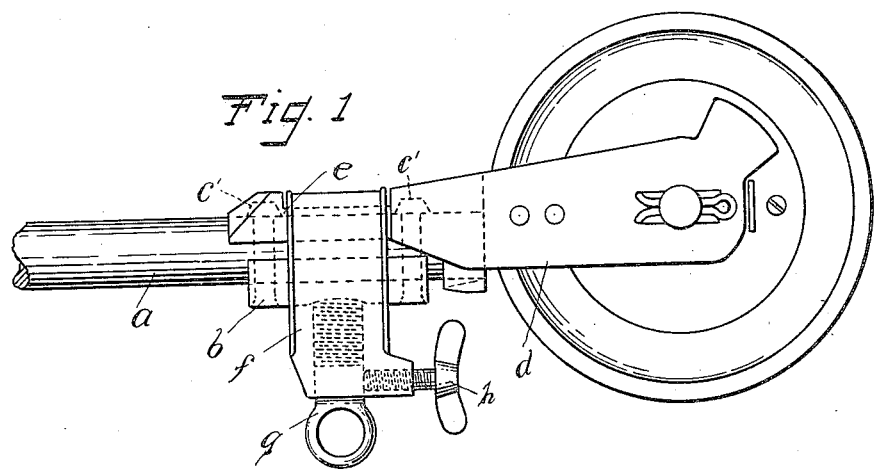
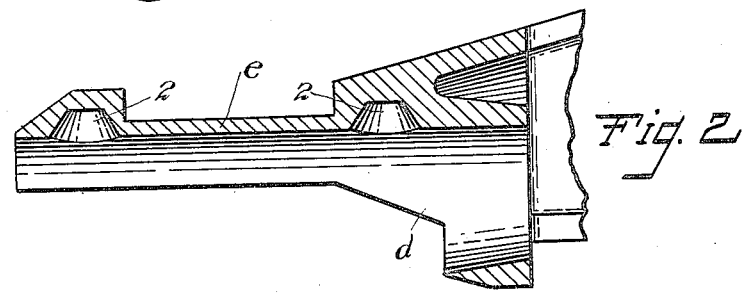
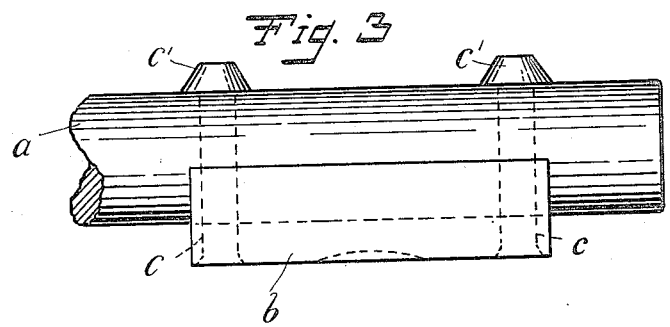
WITNESSES:
INVENTOR.
Frederick M. DuBois:
BY
ATTORNEY.

UNITED STATES PATENT OFFICE.

FREDERICK M. DU BOIS, OF THOMPSONVILLE, CONNECTICUT.

DETACHABLE TROLLEY-HARP.

1,145,006.        Specification of Letters Patent.        Patented July 6, 1915.

Application filed February 6, 1914. Serial No. 816,968.

*To all whom it may concern:*

Be it known that I, FREDERICK M. DU BOIS, a citizen of the United States, and a resident of Thompsonville, in the county of Hartford, State of Connecticut, have invented certain new and useful Improvements in Detachable Trolley-Harps, of which the following is a specification.

The object of this invention is to provide means for detachably securing a trolley harp to the end of a trolley pole in order to facilitate the changing of a harp when any of its parts become worn or broken.

In the drawings Figure 1 is a side view of an embodiment of my invention. Fig. 2 is a central vertical section of the shank of the harp. Fig. 3 is a side view of the end of the pole with the harp removed.

Referring to the drawings, $a$ denotes the trolley pole, to one side of which (and the underside when the pole is in use) there is secured a block $b$, rounded to fit the pole and held in place by rivets $c$, $c$, the heads of which project beyond the surface of the pole at the opposite side from the block $b$.

$d$ is the harp curved to fit closely onto the pole and having recesses 2, to closely fit over the heads $c'$, $c'$, of the rivets $c$, $c$. On the under side of the harp there is formed a hub $e$ which fits the end of the trolley pole.

$f$ is a yoke fitting over a reduced portion of the trolley harp and having a threaded aperture in its lower end into which a bolt $g$ is threaded. This bolt bears against the block $b$ and provides a means for drawing the yoke down to securely clamp the harp onto the pole with the apertures in its shank securely seated on the heads of the rivets.

$h$ is a set screw threaded into the side of the yoke and adapted to hold the bolt against accidental loosening. The engagement of the shank of the harp with the heads of the rivets prevents longitudinal displacement of the harp on the pole, and the end of the pole fitting within the hub $e$ prevents any angular displacement of the harp relative to the pole.

The device provides an extremely simple and easy method of very securely fastening a trolley harp to its pole, making it possible to replace a broken harp without removing the entire pole.

I claim as my invention:

1. The combination with a trolley pole, of a reinforcing member for said pole, rivets holding said reinforcing member on the pole and having heads projecting through the pole, a trolley harp provided with a portion fitting on said pole and having recesses to receive the rivet heads whereby the heads operate to hold the harp in position against longitudinal movement, and a clamp engaging the reinforcing member and the portion of the harp opposite thereto to hold the recesses on the heads.

2. The combination with a trolley pole, of a reinforcing member for the pole, rivets securing said reinforcing member to the pole and having heads projecting from the pole opposite the reinforcing member, a trolley harp provided with an end having recesses engaging over said rivet heads when in position on the pole, the harp being further provided with an annular portion arranged to surround the end of the pole and having the side opposite the recesses beveled to permit tilting of the harp during engagement over the rivet heads, and a clamp surrounding the reinforcing member and the portion of the harp opposite thereto to hold the harp against tilting movement.

3. In a detachable trolley harp, the combination with a pole of interengaging parts on said harp and pole, means for clamping said harp to said pole to hold said interengaging parts in position, and additional means on said harp engaged by the end of said pole to prevent relative angular motion.

4. In a detachable trolley harp, the combination with a pole having projections extending therefrom, a shank formed on said harp and adapted to fit the pole, the shank being provided with an annular portion surrounding the end of the pole and having one side beveled to permit tilting of the shank on the pole, the side opposite the beveled portion being provided with recesses to receive the projections, and a clamp arranged to prevent tilting whereby the harp is held against accidental disengagement.

5. In a detachable trolley harp, the combination with a pole provided with longitudinally alined spaced projections at one side, of a shank on said harp recessed to receive said projections, a hub depending from the under side of said harp and adapted to receive the end of said pole, a yoke surrounding said shank and pole, and a bolt threaded into said yoke and adapted to bear against said pole to clamp said shank to said pole.

6. In a detachable trolley harp, the combination with a pole provided with longitudinally alined spaced projections at one side, of a shank on said harp recessed to receive said projections, a hub depending from the under side of said harp and adapted to receive the end of said pole, a yoke surrounding said shank and pole, a bolt threaded into said yoke and adapted to bear against said pole to clamp said shank to said pole, and a set screw for said bolt.

FREDERICK M. DU BOIS.

Witnesses:
 Amos E. O'Brien,
 Louis Lucia.

Copies of this patent may be obtained for five cents each, by addressing the "Commissioner of Patents, Washington, D. C."